Figure 1:
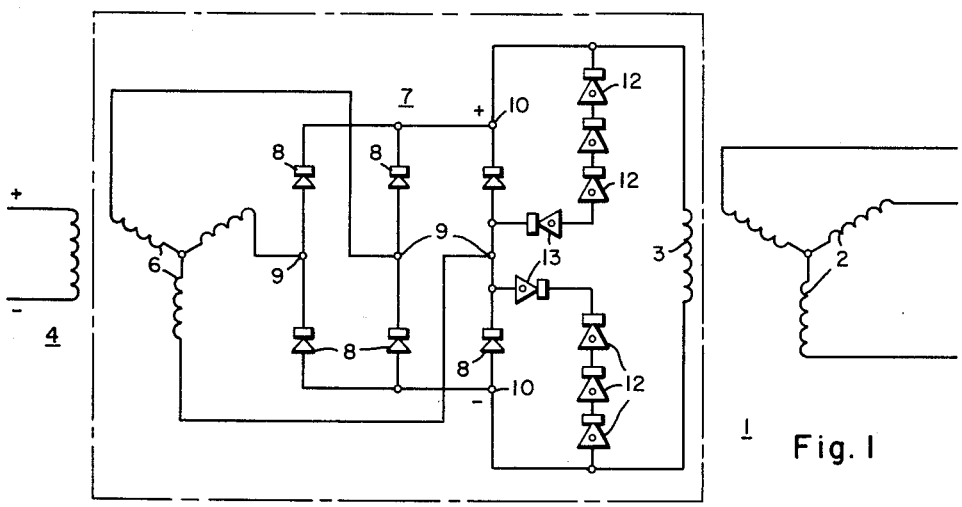

Dec. 18, 1962     M. K. ENNS ET AL     3,069,613

PROTECTION OF ROTATING RECTIFIER ASSEMBLIES

Filed July 1, 1959

WITNESSES
John F. Hearley, Jr.
James F. Young

INVENTORS
Mark K. Enns &
John W Skooglund
BY
ATTORNEY

United States Patent Office 3,069,613
Patented Dec. 18, 1962

3,069,613
PROTECTION OF ROTATING RECTIFIER
ASSEMBLIES
Mark K. Enns, Pittsburgh, and John W. Skooglund,
North Huntingdon Township, Westmoreland County,
Pa., assignors to Westinghouse Electric Corporation,
East Pittsburgh, Pa., a corporation of Pennsylvania
Filed July 1, 1959, Ser. No. 824,357
3 Claims. (Cl. 321—11)

The present invention relates to excitation systems of the rotating rectifier type for alternating current generators and, more particularly, to the protection of the rectifier assembly in a rotating rectifier type of excitation system.

Alternating current generator excitation systems of the rotating rectifier or brushless type include an alternating current exciter which has a stationary field structure and a rotating armature, with a rotating rectifier assembly connected between the exciter armature winding and the rotating field winding of the main generator. The exciter rotor, the rotating rectifier assembly, and the generator rotor which carries the generator field winding are all mounted on a common shaft, or are otherwise mechanically connected together to rotate as a unit, so that the rectifier assembly can be directly connected between the exciter armature winding and the generator field winding to supply direct current excitation to the generator. In this way, an excitation system is provided which requires no commutator, slip rings or brushes, and which has many advantages in reduced maintenance and improved reliability as compared to conventional excitation systems using direct current exciters.

Under certain conditions, some types of load switching operations may cause transient conditions to occur in the generator which cause a momentary reversal of polarity of the generator field and tend to cause momentary reversal of the generator field current. When a rotating rectifier type of excitation system is used, such attempted reversal of the generator field current causes a momentary reverse voltage across the rectifier assembly which may be high enough to cause breakdown of the semiconductor rectifier cells, resulting in destruction of the rectifier even though the reverse voltage may be of quite brief duration. It is necessary, therefore, to provide means for protecting the rectifier assembly against excessive reverse voltages by providing a bypass path for reverse current flow to prevent the development of high reverse voltages across the rectifier assembly. Such a protective means must be highly reliable, and must be capable of being mounted on the rotating assembly since it would be undesirable to use a type of protective means which would require connections from the rotating assembly to a stationary device.

The principal object of the present invention is to provide an alternating current generator excitation system of the rotating rectifier type in which the rectifiers are protected in a simple and reliable manner against damage due to attempted transient reversal of the generator field current.

Another object of the invention is to provide a rotating rectifier type of excitation system in which the rectifiers are protected against excessive reverse voltage by providing a bypass path for the flow of reverse current to prevent the occurrence of dangerously high reverse voltage across the rectifiers in case of reversal of the generator field current.

A further object of the invention is to provide protective means for a rectifier assembly, such as my be used in generator excitation systems, in which the rectifier assembly is protected against excessive reverse voltage by semiconductor means connected across the rectifier and arranged to be non-conductive in both directions under normal conditions, but to become conductive in the reverse direction of the rectifier upon the occurrence of a reverse voltage in excess of a predetermined value, to provide a bypass path for reverse current, and to then remain conductive until the reverse voltage drops to substantially zero.

Figure 2:
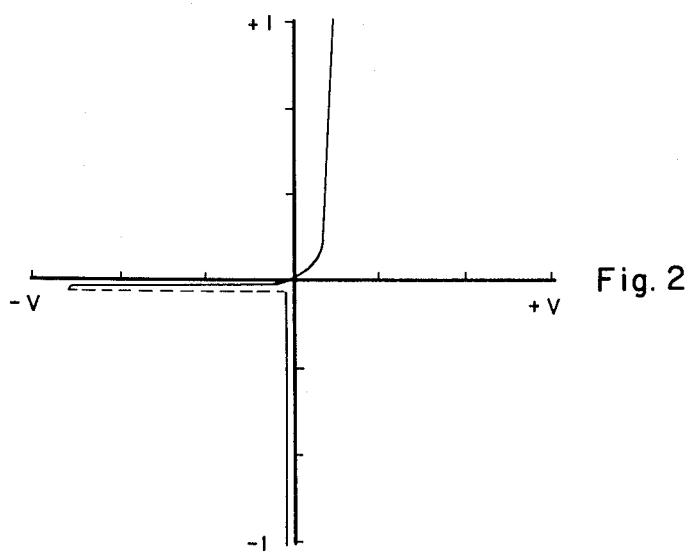

Other objects and advantages of the invention will be apparent from the following detailed description, taken in connection with the accompanying drawing, in which:

FIGURE 1 is a schematic diagram showing an illustrative embodiment of the invention; and FIG. 2 is a diagram illustrating the characteristics of a preferred type of semiconductor device utilized as a protective device.

The invention is shown in the drawing embodied in an excitation system for an alternating current generator 1 which may be of any suitable or usual physical construction. The generator 1 is shown as a three-phase generator having armature windings 2 disposed on the stator of the machine and having a field winding 3 carried on the rotor in the usual manner. The excitation system for the generator 1 includes an alternating current exciter 4 which may also be of any suitable physical construction. The exciter 4 has a direct current field winding 5, which may be excited from any suitable external source or in any other desired manner, and which is carried on the stator of the exciter. The exciter 4 is shown as having a three-phase armature winding 6 which is disposed on the rotor member of the exciter. The excitation system also includes a rotating rectifier assembly 7 which may consist of any suitable number of rectifier units or cells 8 such as silicon diodes or other suitable type of semiconductor rectifier devices. The rectifier cells 8 are mounted in a rotatable assembly in any suitable manner and are connected together in any suitable rectifier circuit. In the embodiment shown, the rectifier assembly 7 consists of a three-phase bridge assembly having alternating current input terminals 9 and direct current output terminals 10. The alternating current input terminals 9 are connected to the exciter armature winding 6, as shown, and the direct current output terminals 10 are connected to the generator field winding 3 to supply direct-current excitation thereto. The exciter armature winding 6 is thus directly connected through the rectifier assembly 7 to the generator field winding 3. The rotor of the exciter 4, the rotating rectifier assembly 7, and the rotor of the generator 1 are mounted on a common shaft, or are otherwise mechanically connected together to rotate together as a unit, as indicated diagrammatically at 11, thus permitting direct electrical connection of the exciter to the generator field winding through the rectifier. In this way, an excitation system is provided which requires no commutator, slip rings or brushes and which has no moving or sliding contacts.

Under some conditions, certain load switching operations may cause transient conditions to occur in the generator 1 which result in momentary attempted reversal of the generator field current. Thus, for example, if the generator 1 is supplying a load through a relatively long transmission line, the constants of the machine and of the line may be such that opening or closing a circuit breaker at the remote end of the line causes a transient to occur in the generator which will force momentary reversal of the field current. Similarly, under some conditions, connection of the generator to an already energized system may cause a similar transient to occur, resulting in reversal of the field current. Whether or not such transients occur, or are of sufficient magnitude to be dangerous, depends upon the constants of the particular machine and of the system to which it is connected, but the necessary conditions are quite likely to occur in service. If such a condition occurs, with an excitation system of the rotating rectifier type, the attempted reversal of the generator field current causes a reverse voltage to appear across the rectifier cells 8 which is high enough to cause breakdown and destruction of the rectifier cells, allowing the reversed field current to flow through the generator field and the rectifier assembly. It is therefore necessary to provide means for protection of the rectifiers against reverse voltage in an excitation system of this kind.

In accordance with the present invention, the rectifier assembly 7 is protected against reverse voltage by means of a plurality of semiconductor diodes 12 connected across the rectifier assembly. The diodes 12 are preferably semiconductor devices having hyperconductive negative resistance characteristics, and may be devices of the type described and claimed in a copending application of J. Philips, Serial No. 642,743, filed February 27, 1957, now Patent No. 2,953,693, issued September 20, 1960. As more fully described in that application, these devices consist of a semiconductor crystal, preferably silicon, having a central zone of one conductivity type with adjacent zones of opposite conductivity type on each side and with a mass of metal in intimate association with one of the last-mentioned zones to provide a source of minority carriers.

Such a device has hyperconductive characteristics upon breakdown, as illustrated in FIG. 2, which shows the relation of current to voltage for both forward and reverse directions. As there shown, the diode 12 has characteristics similar to those of a rectifier when a voltage is applied in the forward or positive direction. When reverse or negative voltage is applied to such a diode, only a negligibly small leakage current flows in the reverse direction as long as the voltage remains below a predetermined breakdown voltage, which is determined in the processing of the device. If this breakdown voltage is exceeded, the diode breaks down and becomes hyperconductive as indicated by the dotted portion of the curve in FIG. 2. That is, the diode becomes freely conductive with very low effective resistance, and the voltage across the diode immediately drops to an extremely low value. After the diode has once broken down, therefore, it remains highly conductive regardless of the applied voltage until the voltage or current are reduced to a very low value. As shown in FIG. 2, the diode remains conductive until the reverse voltage is decreased to an extremely low value, which may be considered as being substantially zero since it is normally considerably less than one volt. If the reverse voltage is reduced below this value, or if the current is reduced to an extremely small value, the diode ceases to be conductive in the reverse direction and regains its rectifying characteristic.

Such a device is very suitable as a protective device since it becomes conductive when the voltage applied in the reverse direction exceeds a predetermined value and thereafter remains conductive until the voltage is reduced to substantially zero, or is reversed, when it again becomes non-conductive in the reverse direction. The semiconductor device disclosed and claimed in the above-mentioned application is very suitable for the purpose of the present invention, since such a device has the characteristics described and is capable of carrying relatively large currents without damage, but it will be understood that any device having similar or equivalent characteristics might be used.

The semiconductor diodes 12 are connected across the rectifier assembly 7 with their polarity the same as that of the rectifier cells 8; that is, the forward direction of the diodes 12 is made the same as the forward direction of the rectifier cells 8. In the preferred embodiment shown in the drawing, a plurality of diodes 12 is connected between any one of the alternating current terminals 9 and one of the direct current output terminals 10 and a second plurality of diodes 12 is connected between the same alternating current terminal 9 and the other direct current output terminal 10. A sufficient number of diodes 12 are connected in series to provide the desired reverse breakdown voltage. The voltage at which the diodes 12 break down and become conducting is chosen to be substantially greater than the normal reverse voltage across the rectifier cells 8 during normal operation but less than the maximum reverse voltage to which the rectifier cells 8 can safely be subjected. As previously indicated, the diodes 12 are connected with the same polarity as the rectifier cells 8 and, in order to prevent current flow in the forward direction through diodes 12, a single diode 13 is connected in series with each group of diodes 12 in opposition thereto to block current flow under normal conditions. The single diodes 13 are sufficient for this purpose since the forward voltage across the rectifier cells 8 during normal operation is quite low and a single diode will block current flow. The diodes 13 may be ordinary rectifiers, if desired, since their purpose is only to block forward current flow.

Thus, under normal conditions, the diodes 12 are non-conductive in both directions and have no effect on the operation of the excitation system. Upon the occurrence of a reverse voltage in excess of the breakdown voltage of the diodes 12, however, such as may result from reversal of the generator field current, the diodes 12 become freely conductive in the reverse direction and provide a low resistance bypass path around the rectifier assembly 7, thus protecting the rectifier cells 8 from the dangerous reverse voltage. The semiconductor diodes 12 remain conductive as long as an appreciable reverse voltage exists. As soon as the reverse voltage across either group of diodes 12 falls to substantially zero, that group of diodes again becomes non-conductive and substantially cuts off current flow in the other group of diodes, so that it also becomes non-conductive. Thus, the rectifier assembly 7 is restored to service by removing the bypass as soon as the dangerous reverse voltage has disappeared. In this way, the rectifier assembly 7 is protected substantially instantaneously against reverse voltages and is immediately restored to service when the transient which caused the reverse voltage has passed.

It should now be apparent that a protective means has been provided for rectifier assemblies which provides very effective protection against reverse voltages. It will be understood that although a particular circuit arrangement has been shown, other arrangements are possible. Thus, any suitable rectifier circuit may be used for the rectifier assembly 7 and the protective diodes 12 may be connected across the rectifier assembly in any suitable manner to provide a path for bypassing the rectifier assembly upon the occurrence of a predetermined reverse voltage. The invention has been described with particular reference to the rotating rectifier type of excitation system for alternating current generators, but it will be apparent that its usefulness is not necessarily restricted to this particular application and that it may be utilized with other types of rectifier assemblies which are intended to supply a load which may be subject to polarity reversal. The system is particularly desirable, however, for rotating rectifiers since it utilizes relatively small semiconductor devices which are capable of carrying high currents without damage and which can readily be mounted on a rotating structure so that no external connections are required. Thus, a simple and highly effective protective means has been provided for protection of rectifier assemblies against undesirable reverse voltages and which is particularly suitable for use in excitation systems of the rotating rectifier type.

A particular embodiment of the invention has been shown and described for the purpose of illustration, but it will be apparent that the invention is not limited to the particular arrangement or the specific circuit connections shown. Thus, various modifications and other embodiments of the invention are possible and all equivalent modifications and embodiments are within the scope of the invention.

We claim as our invention:

1. An excitation system for an alternating current generator having a rotating field winding, said excitation system including an alternating current exciter having a rotating polyphase armature winding mounted for rotation with said generator field winding, a rotating rectifier assembly mounted for rotation with the generator field winding, said rectifier assembly having a plurality of alternating current input terminals connected to said exciter armature winding and having two direct current output terminals connected to the generator field winding to supply direct current excitation thereto, and protective means for the rectifier assembly comprising a first plurality of semiconductor diodes connected in series between one of said alternating current input terminals and one of said direct current output terminals and a second plurality of semiconductor diodes connected in series between said one alternating current input terminal and the other of the direct current output terminals, said diodes being connected with the same polarity as the rectifiere assembly and being of a type which becomes conductive in the reverse direction upon occurrence of a reverse voltage in excess of a predetermined value and which then remains conductive until the reverse voltage decreases to substantially zero, and at least one semiconductor diode connected in series with each of said first and second plurality of diodes in opposition thereto to prevent current flow in the forward direction.

2. A polyphase rectifier assembly comprising rectifier means connected to supply direct current to a load which is subject to reversal of polarity, said rectifier assembly having a plurality of alternating current input terminals and two direct current output terminals, and protective means for the rectifier assembly comprising first semiconductor means connected between one of said alternating current input terminals and one of said direct current output terminals and second semiconductor means connected between said one alternating current input terminal and the other of the direct current output terminals, each of said semiconductor means being connected with the same polarity as the rectifier assembly and being of a type which becomes conductive in the reverse direction upon occurrence of a reverse voltage in excess of a predetermined value and which then remains conductive until the reverse voltage decreases to substantially zero, and at least one semiconductor diode connected in series with each of said first and second semiconductor means in opposition thereto to prevent current flow in the forward direction.

3. An excitation system for an alternating current generator having a rotating field winding, said excitation system including an alternating current exciter having a rotating polyphase armature winding mounted for rotation with said generator field winding, a rotating rectifier assembly mounted for rotation with the generator field winding, said rectifier assembly comprising a plurality of semiconductor diodes connected in a polyphase bridge circuit having a plurality of alternating current input terminals and two direct current output terminals, means for connecting the alternating current input terminals to said polyphase exciter armature winding, means for connecting the direct current output terminals to said generator field winding to supply direct current excitation thereto, a first plurality of semiconductor protective devices connected in series between one of said alternating current input terminals and one of said direct current output terminals, a second plurality of semiconductor protective devices connected between said one alternating current input terminal and the other of the direct current output terminals, said protective devices being of a type which is conductive in the forward direction and normally non-conductive in the reverse direction but which becomes conductive in the reverse direction upon occurrence of a reverse voltage in excess of a predetermined value and remains conductive until the reverse voltage decreases to substantially zero, the protective devices being connected with their forward direction the same as the forward direction of the diodes of the rectifier assembly, and at least one semiconductor diode connected in series with each of said first and second plurality of protective devices in opposition thereto to prevent current flow in the forward direction.

References Cited in the file of this patent

UNITED STATES PATENTS

| | | |
|---|---|---|
| 2,684,461 | Busemann | July 30, 1954 |
| 2,722,652 | Brainard | Nov. 1, 1955 |
| 2,802,954 | Graham et al. | Aug. 13, 1957 |
| 2,905,885 | Burt et al. | Sept. 22, 1959 |
| 2,913,656 | Bliss | Nov. 17, 1959 |
| 2,953,693 | Philips | Sept. 20, 1960 |
| 2,969,494 | Davis | Jan. 24, 1961 |